Figure 1:
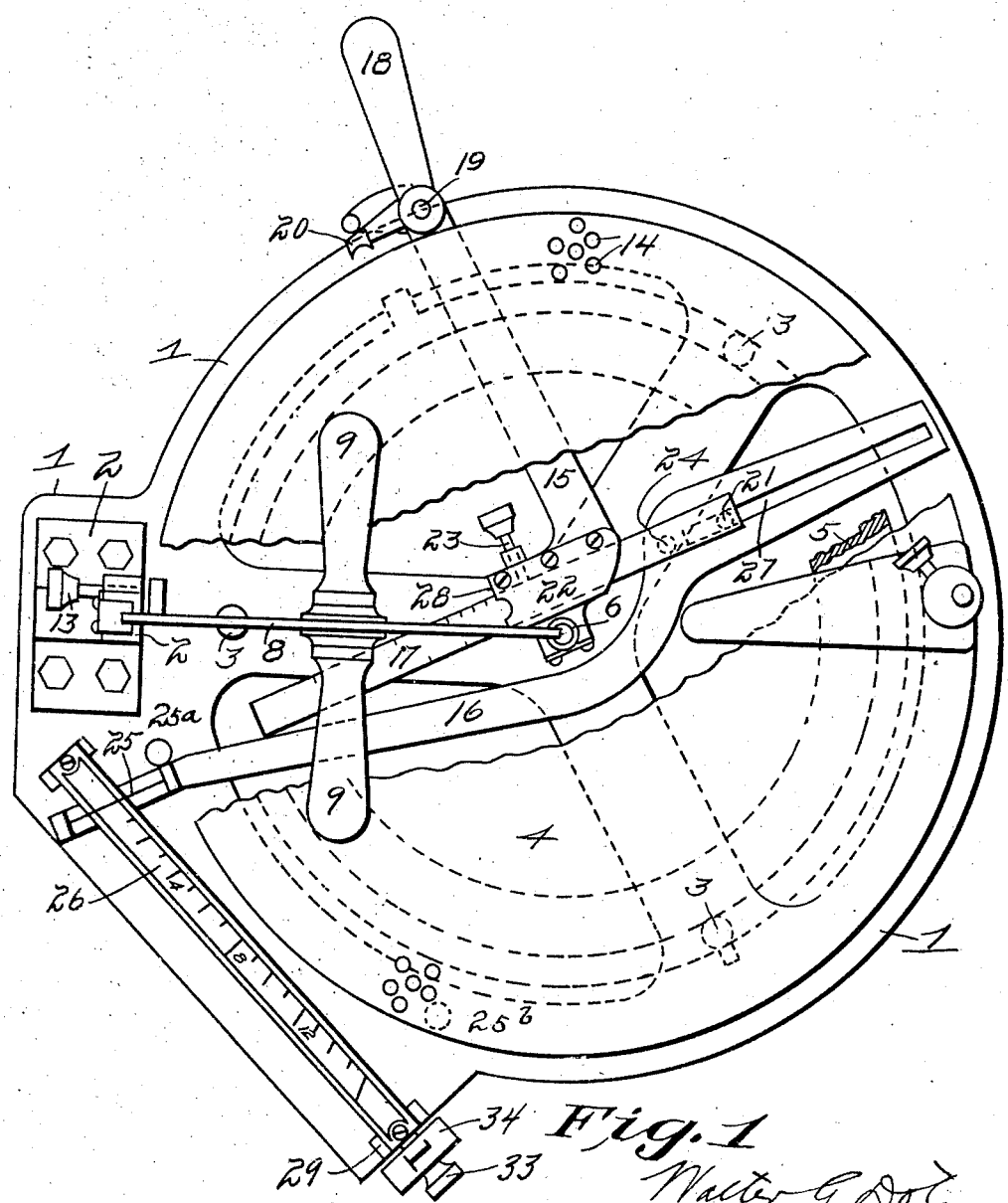

No. 868,626.

PATENTED OCT. 15, 1907.

W. G. DOTY.
CHEESE CUTTER.
APPLICATION FILED NOV. 26, 1906.

3 SHEETS—SHEET 1.

Witnesses

Walter G. Doty,
Inventor

By R. J. McCarty,
his Attorney

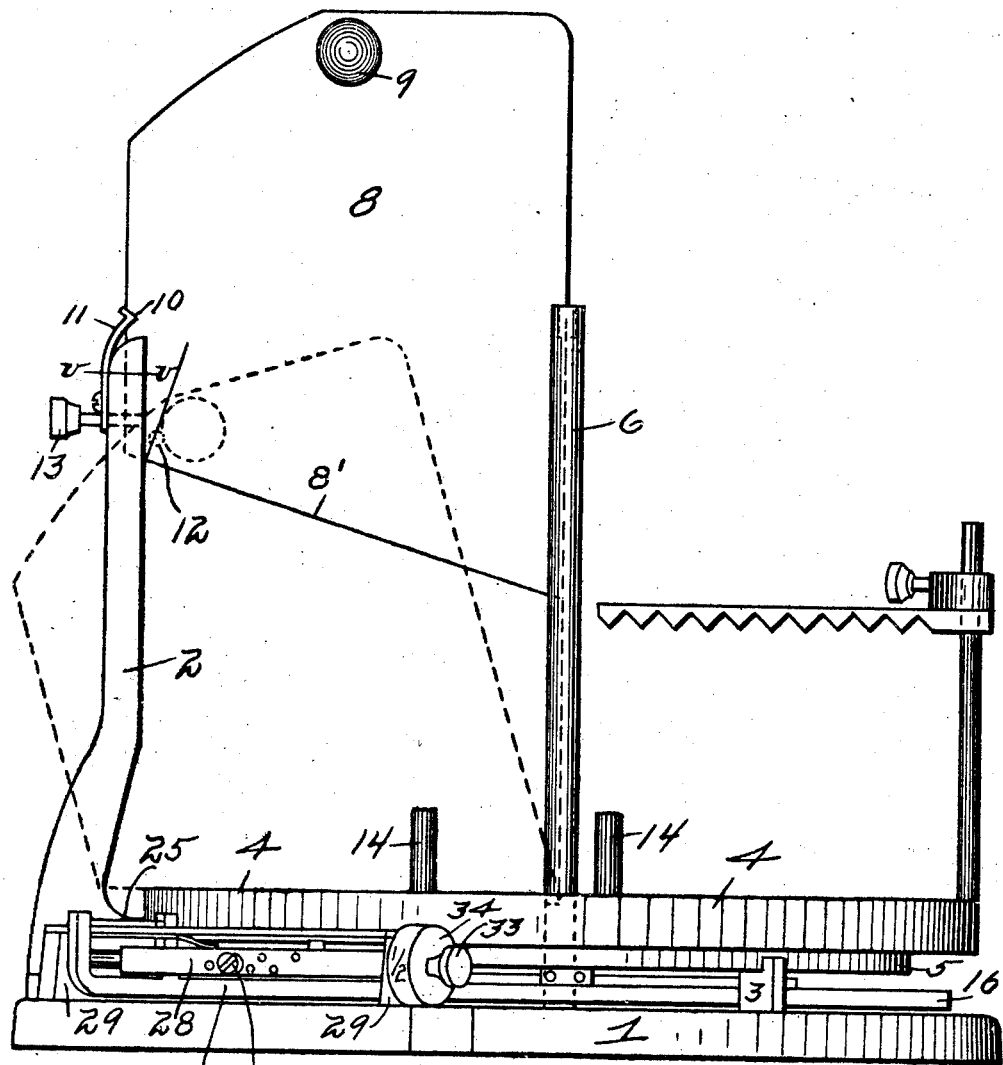

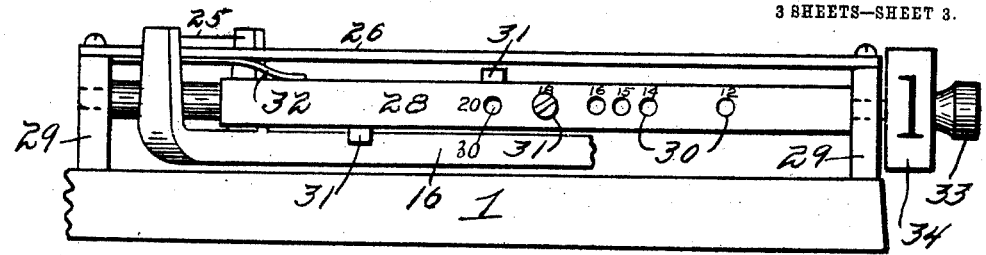
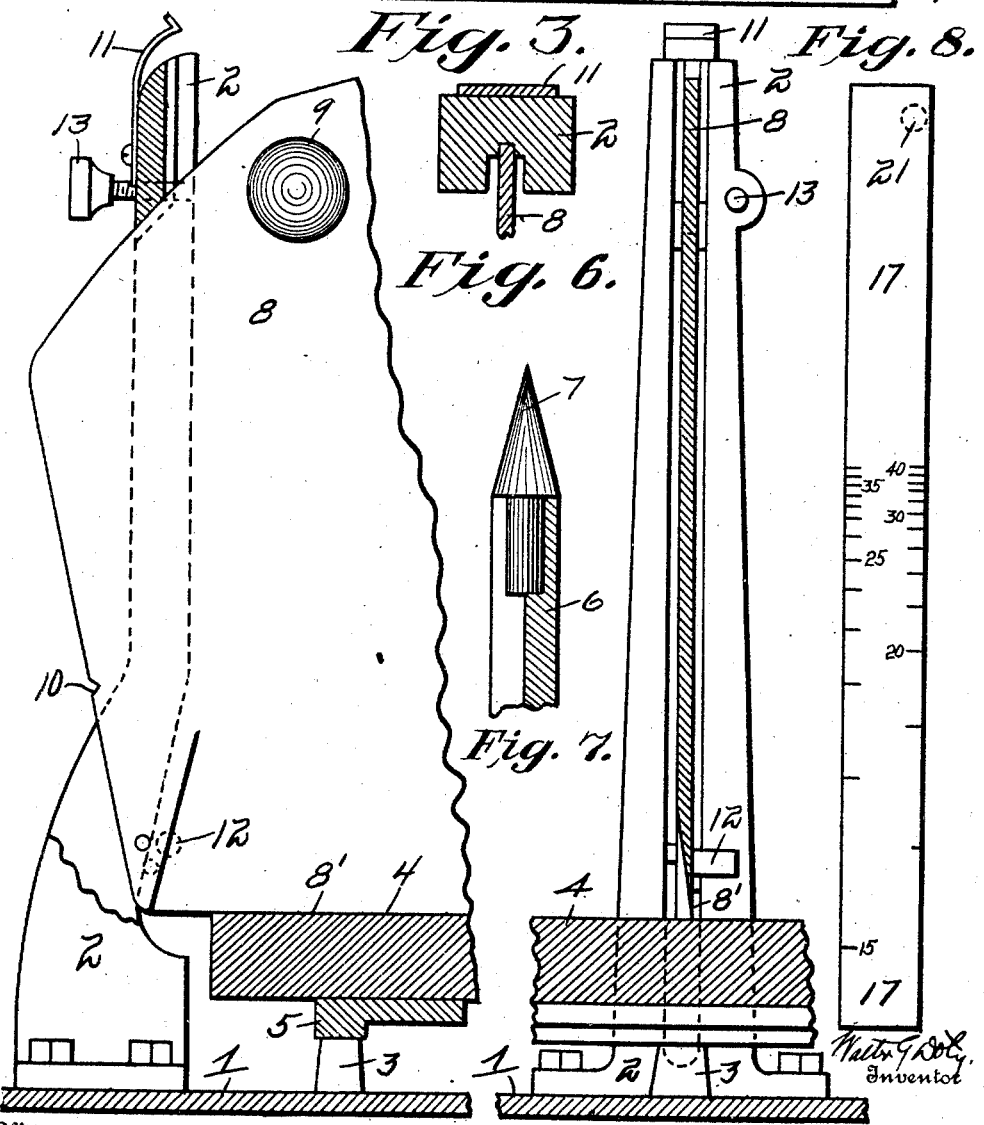

UNITED STATES PATENT OFFICE.

WALTER G. DOTY, OF DAYTON, OHIO, ASSIGNOR TO THE HEINZ MANUFACTURING CO., OF DAYTON, OHIO, A CORPORATION OF OHIO.

CHEESE-CUTTER.

No. 868,626.              Specification of Letters Patent.          Patented Oct. 15, 1907.

Application filed November 26, 1906. Serial No. 345,018.

*To all whom it may concern:*

Be it known that I, WALTER G. DOTY, a citizen of the United States, residing at Dayton, in the county of Montgomery and State of Ohio, have invented certain new and useful Improvements in Cheese-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in cheese cutters and possesses certain features which are similar in some respects to the cheese cutter shown and described in my pending application, Serial No. 297,100—filed January 22, 1906. The points of similarity relate in the main to the construction and operation of the knife or cutting blade, and other minor details which will only be incidentally mentioned hereinafter.

The invention to be hereinafter more fully described relates to the novel construction and arrangement of the assemblage of levers through which the throw of the handle or operating lever is regulated and from which the indicating lever is simultaneously operated, the fulcrums of said series of levers being of a fixed character. And relates further to the computing devices and other devices coöperating therewith and with the cutting blade or knife.

The object of the present invention is to provide in a cheese cutter a construction which combines the greatest simplicity and the greatest accuracy to the end that an entire cake of cheese may be dispensed in any quantities both as to weight and price without the least inaccuracy, so that the sum of either the price or the weight as determined from the retail quantities dispensed, will equal the weight or the price of the entire cake of cheese.

Preceding a detail description of the invention, reference is made to the accompanying drawings. of which—

Figure 1, is a top plan view of my improved cheese cutter with a portion of the rotating cheese board broken out to disclose the assemblage of levers through which the cheese board is rotated and the weights and values are indicated. Fig. 2, is a side elevation showing the knife or cutting blade in two positions which are the positions of the blade at the beginning and completion of its operations of cutting the segments of cheese. Fig. 3. is a detail enlarged side elevation of the computing devices. Fig. 4, is a detail view of the cutting blade and coöperating devices, a portion of the blade being broken away and other parts broken away and shown in section. Fig. 5, is a detail view of the parts shown in Fig. 4, looking at right angles to Fig. 4, and the knife, cheese board and base shown in section. Fig. 6, is a cross section on the line v—v of Fig. 2. Fig. 7, is a sectional view of the upper end of the center post with the detachable cone in position. Fig. 8, is a detail view of the scale arm through which the throw of the operating handle is regulated.

In a detail description of the invention, similar reference characters indicate corresponding parts.

The portions of the metallic base are designated 1 and consist of an annular portion with inwardly-extending branches which unite at the axis of said base or frame; at a side of said base or frame there are extended portions which are adapted to provide for the mounting of the upright slotted guide standard 2 to be again referred to, and the computing devices to be again referred to in detail. Also projecting from suitable points from the upper side of the frame are a series of lugs 3 which support the cheese board 4, there being an annular track 5 attached to the lower side of the cheese board in the form of a suitable metal ring which rides over the lugs 3 when the cheese board 4 is given rotatable movement in a manner presently described.

Extending from the axis of the frame 1 and through a suitable opening in the axis of the cheese board 4, is a guide standard 6 which projects through the center of a cake of cheese when the latter is placed upon the board 4. In the act of inserting a cake of cheese in position upon the board 4, the cone 7 shown in Fig. 7, is placed upon the upper end of the guide standard 6 and affords means for penetrating the center of a cake of cheese with the least possible resistance. After the cake of cheese is thus placed in position upon the board, the cone 7 is removed and the knife or cutting blade 8 is placed in its operative position in the guide slot in said standard 6 and the guide slot in the standard 2. The knife is provided with a handle 9 extending on both sides thereof so that in the operations of cutting the cheese it may be manipulated with both hands from the position shown in full lines in Fig. 2, to that shown in dotted lines. This knife is substantially the same as shown and described in my former application hereinbefore referred to, and one of the essential features thereof is the upwardly and outwardly tapering cutting edge 8' which permits of said blade being given an outward tilting movement in the final cut. The outer edge of the blade is provided with a notch 10 which, when the blade is elevated to a desirable point for each cut, engages a spring 11 attached to the standard 2 and holds said blade in the elevated position as shown in Fig. 2. At a lower point on one side of the blade there is a pin 12 extending out a sufficient distance to make contact with the inner end of an adjustable screw 13 which penetrates the upper end of the guide standard 2 on one side of the slot in said standard and out of the path of the knife. These stops 12 and 13 coöperate to stop the upward movement of the knife at the point where the end of the spring enters the notch 10, or whenever it is desirable to support the knife in a higher position, the screw 13 may be withdrawn to permit the blade to be moved higher or to a point which brings the stop pin 12 thereon above the position of the screw 13, and the screw 13 may then be projected through the standard below the pin 12 and thus be made a more permanent support for the cutting blade in an elevated position.

The cheese board is provided with the desirable number of pin openings 14 in which pins may be inserted on the outside of the cake of cheese to serve to maintain the cheese in a firmer position whenever such will be necessary.

I now proceed to describe in detail one of the most important features of my invention and which relates to the novel construction and assembling of the levers and adjunctive devices through which the cheese board is rotated and the computing devices are operated. The operating lever 15, the index lever 16 and the numerical scale arm 17 constitute the assemblage of levers referred to, and these are operated simultaneously from the operating lever 15; the latter lever is operated by the operator who grips the handle 18 thereof which extends beyond the frame of the machine and is pivoted to the lever 15 at 19. The inner end of the handle portion 18 has a clamp extension 20 which clamps the rim of the cheese board when the handle 18 is moved in one direction and releases said cheese board when the handle is moved in an opposite direction. After the clamp 20 engages the periphery of the cheese board, the latter is rotated together with the operating lever 15, such rotation depending upon the position of the movable pin 21 of the scale arm 17. The operating lever 15 has a permanent fulcrum at its inner end upon the center post or standard 6, and said lever also carries upon its inner end an open end support 22 through which the scale arm 17 is projected and in which said scale arm is adjustable and is fixed in its support 22 at the desired adjustment by the binding screw 23. The scale upon the lever 17 indicates the weights of the cakes of cheese before they are cut. Referring to Fig. 8, it will be observed that the said scale denotes the various weights of cakes of cheese from fifteen pounds up to forty, these being the standard sizes of cakes of cheese. The operating lever 15 as before stated, has a fixed fulcrum and the scale arm owing to its being carried upon and movable with said operating lever, also has the same common fulcrum which is the center post or standard 6 as before stated. The index lever 16 has a suitable curvature to clear the central post or standard 6 and this lever also has a fixed fulcrum 24 on the base or frame 1.

It will be understood that the assemblage of levers now being described are immediately above the framework or base of the machine and below the cheese board 4. To return to the index lever 16, this lever carries upon one end an indicator 25 which is preferably in the form of a wire which extends across the upper face of a permanent indicator or scale 26 which will be again referred to, while the extreme end of the lever itself lies below said indicator 26 as shown in Fig. 3.

These indicators will be again referred to in connection with the computing devices. The short end of the index lever 16 has an elongated slot 27 into which the pin 21 projecting from an end of the scale arm 17 projects. It will be observed that in the longitudinal adjustment of the scale arm 17 to the desired point which is measured by the pointer 28 of the scale arm support 22, the position of the pin 21 in the slot 27 may be varied to any point within the length of the slot 27 and thus it will be seen that while the index lever 16 is movable from the operating lever 15 through the scale lever 17, the extent of the throw or movement of the operating lever 15 and the cheese board therewith, is dependent upon the position of the connection between the scale arm 17 and the index lever 16, to-wit— the pin 21. In other words, the leverage or throw of the scale arm 17 is shortened or lengthened and therewith the throw of the operating lever 15 is likewise shortened or lengthened. For example, when the arm 17 is lengthened, the throw of the lever 15 is shortened. As shown in Fig. 1, the sliding pin connection between the scale arm 17 and the index lever 16 is near the end of the slot 27; the throw of the operating lever 15 is likewise shortened and would be the minimum throw if the pin 21 were shifted with the arm 17 to bring said pin in the extreme inner end of the slot 27; likewise the throw of the operating lever 15 would be the maximum throw when the pin 21 is moved to the outer limit of the slot. The importance of this means for obtaining variable movements of the operating lever 15 and the cheese board 4 will be readily understood when it is considered that the weight of cakes of cheese vary considerably; it having been hereinbefore stated that the scale lever 17 is graduated to indicate cakes of cheese varying from fifteen pounds to forty pounds. It will be readily seen that in rotating the cheese board with a cake of cheese thereon, weighing say fifteen pounds, the extent of movement of the cheese board for each pound of cheese to be cut would be just twice that which would be necessary with a cake of cheese weighing thirty pounds, and would be still greater in comparison with the rotation of a cake of cheese weighing forty pounds. Take for example, a cake of cheese weighing thirty pounds, the weight of the cheese is first ascertained before it is placed on the cheese board, the position of the scale arm 17 is then shifted to a position for the index surface 28 of the holder 22 to be in line with "30" on said scale arm. The position of the pin 21 in the slot 27 would likewise be shifted and the operating lever 15 would have an extent of movement corresponding to one pound of cheese, that is to say, each movement of said operating lever would rotate the cake of cheese to the extent of one pound or to a position for the knife to cut one pound, and thirty such movements of the operating lever would be equal to a full rotation of the cake of cheese or would rotate the cake of cheese to the last remaining pound. The same operation takes place with cakes of cheese of greater or less weight, depending upon the regulation of the throw of the lever 15 through the shifting connection 21 as before indicated.

The computing scale 26 before referred to, is permanent and indicates the weight of the cheese in ounces and up to one pound at any price per pound; this scale may be of course varied if found necessary, but for practical retail purposes, it is found that a pound and ounce multiples thereof are sufficient to be indicated on the scale. This scale is utilized alone for vending the cheese by weight quantities as before stated, and the maximum throw of the index lever 16 is equal to the length of the indications on said scale or from zero to one pound. It will be understood that while the operating lever 15 is controlled in a throw by the pin 21, the throw of the index lever 16 is not so controlled. The full movement of said index lever 16 will take place whether the pin 21 is at one end of the slot 27 or at the other end. The zero stop of said lever is at 25ª, and the stop of said lever in the reverse direction is at 25ᵇ which is the maximum extent of movement for a pound cut.

In dispensing a one-half pound of cheese, the index or pointer 25 on the lever 16 is moved midway of the length of the permanent weight scale 26 where "8" appears and which indicates ounces; this movement or any other movement of the index lever 16 for less quantities than a pound may be regulated by the eye, or they may be regulated by positive stops presently described.

Rotatably mounted below the fixed weight indicator 26 is a bar 28, the journals of which are mounted in the uprights 29 upon which the permanent weight indicator 26 is supported. The bar 28 is preferably rectangular in cross section, but it is obvious that it might be made cylindrical. Two of the four sides of said bar contain a plurality of orifices which indicate the various prices per pound of the different cakes of cheese dispensed. Insertible in the desired one of said orifices is a stop pin 31 which stops the index lever 16 at such point as it may be placed, and thus limits said index lever in its movement. Another side of the rotatable bar 28 is provided with a fixed pin 31 midway of its length which limits the movement of the index lever 16 midway of the length of said scale 26, while the fourth side of said bar 28 is devoid of any stop pins and when this side is turned to the lower position, the index lever 16 is permitted to move the entire length of the scale 26 or to the extent of one pound of cheese.

It will be understood that the stop pins 31 in whatever openings 30 they may be placed and including the permanent stop pin 31 hereinbefore referred to as stopping the lever 16 at one-half the length of the scale 26 or for a half pound cut, must be in their lower positions in order to arrest the movement of the lever 16, or in other words, the side of the bar 28 containing each pin must be moved to the lower position by rotating said bar. In Fig. 3 the stop pin in the side of the bar is in the opening which indicates ten cents' worth cheese at "18" cents per pound. If said pin is placed in any of the openings, the same amount of cheese will be measured, to-wit—ten cents' worth, but the rate per pound will be different. The figures adjacent to the openings indicate different prices per pound; for example, if the pin 31 is in the opening indicated by "12" the lever 16 will be stopped at that point and the amount of cheese will be ten cents' worth at twelve cents per pound. The pin 31 on the lower side of the bar 28 is in a position to stop the lever 16 at five cents' worth of cheese at a given price per pound. If said pin is placed in any of the other openings on that side of the bar, it will permit the movement of the lever 16 to the extent of five cents worth of cheese, but the price per pound will be different, or in other words, the position of the pin 31 varies in dispensing five cents' worth of cheese at different prices per pound. As it appears in Fig. 3, the pin 31 which is in a position to stop the lever 16, is nearer the starting point of said lever so that the lever would not have much range of movement in measuring a five cent cut of cheese and this shows that the cheese so dispensed is at the maximum price per pound. The uppermost pin 31—Fig. 3, is midway of the bar and will stop the lever 16 at a half pound at any price per pound, and the side of the bar which has no stop permits the lever 16 to move its full extent to measure a pound of cheese at any price per pound. A spring 32 presses against the upper side of said bar 28 and maintains it in position until it is rotated by the fingers which engage the finger-piece 33 on the extreme end of said bar; adjacent to this finger-piece 33 is an indicator wheel 34 which bears the following indications: "1" which stands for one pound of cheese and is in line with the side of the bar 28 opposite to that side which has no stop pin 31, therefore, permits the index lever 16 to move the entire length of the bar 28 and the permanent scale 26; "½" which stands for one-half pound of cheese and is in line with that side of the bar 28 which is opposite the side having the fixed pin 31 midway of its length and which stops the index lever 16 midway of the length of said bar 28 and scale 26; "10" which is in line with the side of the bar 28 opposite that side which has the pin 31 a little to one side of the middle of said bar 28 and thus stops the index lever 16 when it is moved slightly beyond the middle of said bar 28, at which point it has indicated ten cents' worth of cheese retailing at eighteen cents per pound; "5" which is in line with that side of the bar 28 which is opposite the side of the bar containing the stop pin 31 which lies on one side of the middle of the bar 28 and near the end thereof, and which stops the lever 16 before it reaches the middle of said bar 28 as shown in Fig. 3 where the stop pin 31 to the left of the middle of the bar 28 is that pin just referred to and which indicates five cents' worth of cheese at eighteen cents per pound.

From the foregoing description it will be seen that when the side of the bar 28 which has no stop pin, is in the lower position, the index lever 16 is free to move the entire length of the permanent indicator or scale 26 to measure or indicate a pound of cheese or any less portion thereof in ounces and at any price per pound; when that side of the bar 28 having the pin midway of its length is turned down, the said lever is stopped at the half pound or eight ounce point on the scale 26 at any price per pound. When the other sides of the bar 28 are utilized, one of which is shown in Fig. 3, the pin 31 is inserted in the desired opening 30 as hereinbefore stated, and the index lever 16 is stopped at whatever point said pin is placed for ten cents' worth of cheese at any price per pound; these two latter sides of said bar are utilized as before stated, when dispensing a definite purchase of cheese without reference to the weight thereof, for example, five or ten cents' worth.

I claim:

1. In a cheese cutter, an operating lever, an index lever, and longitudinally adjustable means interposed between said operating lever and index lever for varying the throw of the operating lever.

2. In a cheese cutter, an operating lever, an index lever, a graduated arm or member movable with the operating lever, said graduated arm or member having means for varying its connection with the index lever to vary the throw of the operating lever.

3. In a cheese cutter, an operating lever, a graduated arm or member carried thereon, an index lever, and means for varying the connection between the graduated arm or member and the index lever whereby the throw of the operating lever is controlled.

4. In a cheese cutter, an operating lever, means thereon for clamping a cheese board to be rotated thereby, an arm or member having a numerical scale thereon and adjustably supported on the operating lever, and an index lever connected with said scale arm or member, said index lever and said operating lever having fixed fulcrums, and the scale arm or member being adapted to different connections with the index lever to vary the throw of the operating lever.

5. In a cheese cutter, a cheese board, an operating lever for rotating said cheese board, said operating lever having a permanent fulcrum, an index lever, a scale arm or member supported upon the operating lever and through which movement is imparted to the index lever, and means for varying the connection between the scale arm or member and the index lever to vary the throw or movement of the cheese board through the operating lever.

6. In a cheese cutter, a rotatable cheese board, an operating lever adapted to intermittently rotate said cheese board and having its fulcrum at the axis of the cheese board, an index lever, and an arm or member interposed between the operating lever and said index lever and having longitudinal adjustment, with means for varying the connection between said interposed arm or member and the index lever and whereby the movement of the operating lever may be varied.

7. In a cheese cutter, an operating lever having a permanent fulcrum, an index lever having a permanent fulcrum, an arm or member interposed between the operating lever and the index lever, means for varying the connection of said interposed arm or member with the index lever, and whereby movement is imparted from the operating lever to the index lever and the movement of the operating lever may be varied.

8. In a cheese cutter, an operating lever having a fixed fulcrum, an index lever having a fixed fulcrum, and a graduated arm or member movable on the fulcrum of the operating lever, and lying at right angles to said operating lever and parallel with the index lever, and means for varying the connection between the index lever and said graduated arm or member whereby the extent of movement of the operating lever is determined.

9. In a cheese cutter, a weight indicator, an index lever movable to points on said weight indicator, an operating lever, an arm or member interposed between said operating lever and said index lever and through which movement is imparted from the operating lever to the index lever and the movement of the operating lever is regulated, said interposed arm or member having a numerical scale thereon, and means for varying the point of connection between the index lever and said interposed arm or member whereby the movement of the operating lever may be regulated.

10. In a cheese cutter, a rotatable cheese board, an operating lever engaging said cheese board to rotate the same, an indicator to indicate the weights of quantities of cheese dispensed, an index lever movable to the points on said indicator simultaneously with the movements imparted to the cheese board through the operating lever, an arm or member interposed between the operating lever and the index lever by which movement is imparted to said index lever, and means for varying the point of connection between said index lever and said interposed arm or member whereby the movement of the operating lever is determined.

11. In a cheese cutter, a permanent indicator to indicate the specific quantities of cheese dispensed, an index lever, means for stopping the throw of the index lever to indicate the quantity of cheese dispensed by the weight thereof or the money value thereof, a rotatable support for said cheese, an operating lever adapted to move said rotatable support, and a changeable connection between said operating lever and the index lever whereby the throw of the operating lever is controlled.

12. In a cheese cutter, a permanent indicator to indicate the weight of specific quantities of cheese dispensed, a rotatable member adjacent to said permanent indicator, weight indications and stop devices on said rotatable member to limit the movement of the index lever, a visible index by which the movement of the rotatable member is determined, and an operating handle with intervening mechanism by which the index lever is operated.

13. In a cheese cutter, an index lever, a cheese board, an operating lever for simultaneously moving the cheese board and the index lever, an adjustable arm or member forming a connection between the operating lever and the index lever and whereby the movement of the cheese board may be regulated, a permanent indicator to indicate the weight of specific quantities of cheese dispensed, and an auxiliary indicator to indicate money values of specific quantities of cheese dispensed, said auxiliary indicator having means thereon to stop the index lever at the desired points.

14. In a cheese cutter, an index lever, a permanent indicator denoting the weight or specific quantities of cheese dispensed, a rotatable bar parallel to said indicator, means on said bar to arrest the movements of the index lever at various points throughout the length of said bar, indications on said bar showing the various prices per pound of the cheese to be dispensed, and an index wheel movable with said bar and by which the position of the bar is determined.

In testimony whereof I affix my signature, in presence of two witnesses.

WALTER G. DOTY.

Witnesses:
C. M. THEOBALD,
R. J. MCCARTY.